United States Patent [19]

Kilvington

[11] Patent Number: 4,601,005
[45] Date of Patent: Jul. 15, 1986

[54] RECEIVERS FOR NAVIGATION SATELLITE SYSTEMS

[75] Inventor: John Kilvington, Farnborough, England

[73] Assignee: The Secretary of State for Defence in Her Britannic Majesty's Government of the United Kingdom of Great Britain and Northern Ireland, London, England

[21] Appl. No.: 449,789

[22] Filed: Dec. 14, 1982

[30] Foreign Application Priority Data

Dec. 31, 1981 [GB] United Kingdom ................. 8139168

[51] Int. Cl.[4] .......................... G06J 1/00; H04J 13/00; H04B 1/06
[52] U.S. Cl. .................................... 364/602; 364/715; 364/726; 375/1
[58] Field of Search ............... 364/456, 460, 726, 724, 364/443, 444, 445, 602, 604; 343/5 FT, 352, 378, 394; 375/1, 15; 455/209, 213, 225

[56] References Cited

U.S. PATENT DOCUMENTS

| | | | |
|---|---|---|---|
| 3,987,285 | 10/1976 | Perry | 364/724 |
| 4,003,054 | 1/1977 | Goldstone | 343/5 DP X |
| 4,028,626 | 6/1977 | Motley et al. | 375/15 |
| 4,114,155 | 9/1978 | Raab | 343/394 |
| 4,169,245 | 9/1979 | Crom et al. | 343/378 |
| 4,315,263 | 2/1982 | Neidell | 343/378 |
| 4,359,733 | 11/1982 | O'Neill | 364/424 X |
| 4,455,651 | 6/1984 | Baran | 375/1 X |
| 4,472,720 | 9/1984 | Reesor | 343/394 |
| 4,485,477 | 11/1984 | Nossen | 375/1 |
| 4,494,238 | 1/1985 | Groth, Jr. | 375/1 |

OTHER PUBLICATIONS

Tribolet: A New Phase Unwrapping Algorithm, IEEE Transactions on Acoustics, Speech and Signal Processing, vol. ASSP-25, No. 2, Apr. 77, pp. 170-177.
Sams & Co. (textbook publisher): Reference Data for Radio Engineers, 1968, pp. 42-11, 42-12, 44-1,2 of interest.

Primary Examiner—Felix D. Gruber
Attorney, Agent, or Firm—Cushman, Darby & Cushman

[57] ABSTRACT

A receiver for a navigation satellite system such as NAVSTAR, including an antenna for receiving an incoming coded, time-based, spread spectrum signal which includes navigational data from a plurality, P, of satellites, a circuit for deriving baseband I and Q components of each of the signals, circuitry for digitizing the I and Q components, a Fast Fourier Transform (FFT) processor for transforming the digitized I and Q components and their respective codes, and a multiplier for multiplying together the transformed components and codes derived for each of the P satellite signals and to inverse transform the signals and to then determine correlation peaks in the inverse transformed signals.

3 Claims, 2 Drawing Figures

RECEIVERS FOR NAVIGATION SATELLITE SYSTEMS

BACKGROUND OF THE INVENTION

The present invention relates to receivers for, for example, a ship or an aircraft, for receiving signals from navigation satellites such as for example NAVSTAR satellites which form part of a global positioning system.

NAVSTAR is a system which requires a receiver capable of receiving signals simultaneously from at least four NAVSTAR satellites to obtain a navigational fix. The satellites transmit highly stable time-based, spread spectrum signals and navigational data which are received by users. The user's receiver correlates spread spectrum signals from four or more satellites with known spectrum spreading codes to thereby obtain navigational data which is then computed to give the user's position, (see "Navigation", 25, (2), Summer 1978).

SUMMARY OF THE INVENTION

The present invention provides a low-cost receiver for a navigation satellite system such as NAVSTAR.

According to the present invention, a receiver for a navigation satellite system includes an antenna for receiving coded time-based spread spectrum signals which include navigational data from a plurality, P, of satellites, and means for convolving a segment of the signal with its code by Fourier transforming the segment, multiplying the transform point by point with the segment to give a resultant signal and inverse transforming the resultant signal to produce a correlation peak at a point having a position which gives the relative shift between the incoming signal and the code.

Said means for convolving a segment of the signal with its code includes means for deriving baseband I and Q components of each of the signals, means for digitizing the I and Q components, a Fast Fourier Transform (FFT) processor and for transforming the digitized I and Q components and their respective codes, multiplier means arranged to multiply together the transformed components and codes derived for each of the P satellite signals, an inverse FFT processor arranged to inverse transform the signals from the multiplier means.

The receiver may further include scanning means for determining correlation peaks in the inverse transformed signals.

An advantage of the system is that it does not require the generation of a local oscillator frequency for each satellite with Doppler shift compensation.

If a sequence of measurements $x(t_n)$ taken at intervals equally spaced by time T is represented by the discrete frequency spectrum $$x(t_n) = \sum_{k=0}^{N-1} a(\omega_k) \exp j\omega_k t_n \quad (1)$$

then $$a(\omega_k) = \frac{1}{N} \sum_{n=0}^{N-1} x(t_n) \exp(-j\omega_k t_n) \quad (2)$$

where $t_n = nT$, $\omega_k = 2\pi k/NT$ and N is the total number of measurements in the sequence. This is the Discrete Fourier Transform (DFT) pair. The interval between frequency components is 1/NT, i.e. the reciprocal of the sequence length. The Fast Fourier Transform (FFT) is a way of calculating the DFT quickly, and is most convenient if N is a power of 2.

A digitized Navstar signal $s(t_n)$ can be expressed as a series using (1):

$$s(t_n) = a_0 \exp j\omega_0 t_n + a_1 \exp j\omega_1 t_n + \quad (3)$$

and so may the code:

$$c(t_n) = b_0 \exp j\omega_0 t_n + b_1 \exp j\omega_1 t_n + \quad (4)$$

Then the cross-correlation $R_{sc}(\tau)$ is given by:

$$R_{sc}(\tau) = <s(t_n + \tau)c^*(t_n)>$$

where $< \ldots >$ denotes averaging over a long series of $t_n$ values, and can only have values which are integer multiples of T. Then from (3) and (4):

$$R_{sc}(\tau) = <[a_0 \exp\{j\omega_0(t_n + \tau)\} + a_1 \exp\{j\omega_1(t_n + \tau)\} + \ldots] \times \quad (5)$$

$$[b_0^* \exp\{-j\omega_0 t_n\} + b_1^* \exp\{-j\omega_1 t_n\} + \ldots]>$$

$$= a_0 b_0^* \exp j\omega_0 \tau + a_1 b_1^* \exp j\omega_1 + \ldots$$

since all terms of the form $\exp\{j(\omega_i - \omega_j)t_n\}$ average to zero if $i \neq j$. Comparing (5) with (3), and since the coefficients $a_0$, $a_1$ etc are the transform of s, it follows that the cross-correlation may be performed by multiplying corresponding elements of the transforms (with conjugation since s and c are complex) and then performing an inverse transform.

BRIEF DESCRIPTION OF THE DRAWINGS

An embodiment of the invention will now be described by way of example only with reference to the drawings of which.

DETAILED DESCRIPTION OF THE PREFERRED EMBODIMENT

Figure 1:
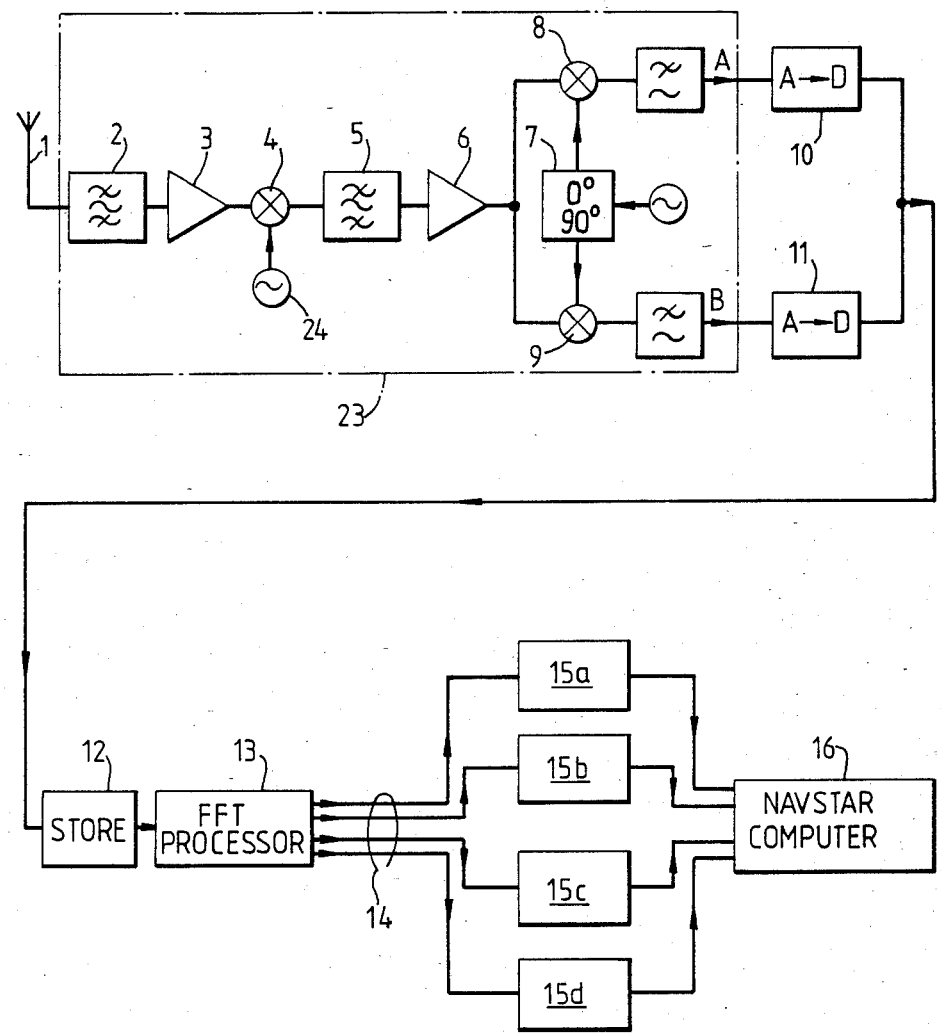
FIG. 1 is a schematic circuit diagram of a receiver for receiving signals from NAVSTAR navigation satellites and computing position data therefrom.

The receiver of FIG. 1 has an antenna 1 for simultaneously receiving signals from four NAVSTAR satellites. The incoming signals include a Coarse/Acquisition (C/A) signal comprising a 1.023 MHz clock rate code bi-phase modulated on a 1575.42 MHz carrier which is also bi-phase modulated by 50 bit/sec navigation data, the whole being subject to a Doppler shift of up to 5 parts in $10^6$ due to the motion of the satellites and the receiver. The signals received by the antenna are fed to an input circuit 23 which employs fixed tuning to bring a 1575.42 MHz carrier to zero frequency and produces in-phase and quadrature components, the output bandwidth being about 1 MHz with a noise figure of about 5 dB to give a typical signal/noise ratio of the code at output, indicated as A and B in FIG. 1, of −20 dB.

The signals from the antenna 1 are fed via filter 2 and amplifier 3 to a mixer 4 which has a second input from a local oscillator 24. After passing filter and amplification stages 5, 6 respectively, the output signal is then divided into in-plane and quadrature components in mixers, 8, 9.

The output signals A, B are digitized in analog-to-digital converters 10, 11 respectively, which produce 1024 samples of the I and Q signals at 977.5 ns intervals every 10 ms, the sample sequence lasting 1 ms and hence corresponding to 1 kHz bandwidth, the resolution being 4 to 5 bits. A store 12 holds the 1024 samples which are then processed by a Fast Fourier Transform (FFT) processor 13 which produces the required transform. The output signals from the FFT processor 13 are fed in parallel on four lines 14 to four identical signal processors 15 $a$ to $d$, each corresponding to a particular satellite. The processor 13 includes LSI FFT circuits in the form of simple card sub-systems as described in "Electronic Design", 9, pp.79–85, Apr. 26, 1979, by L. Schirm.

Figure 2:
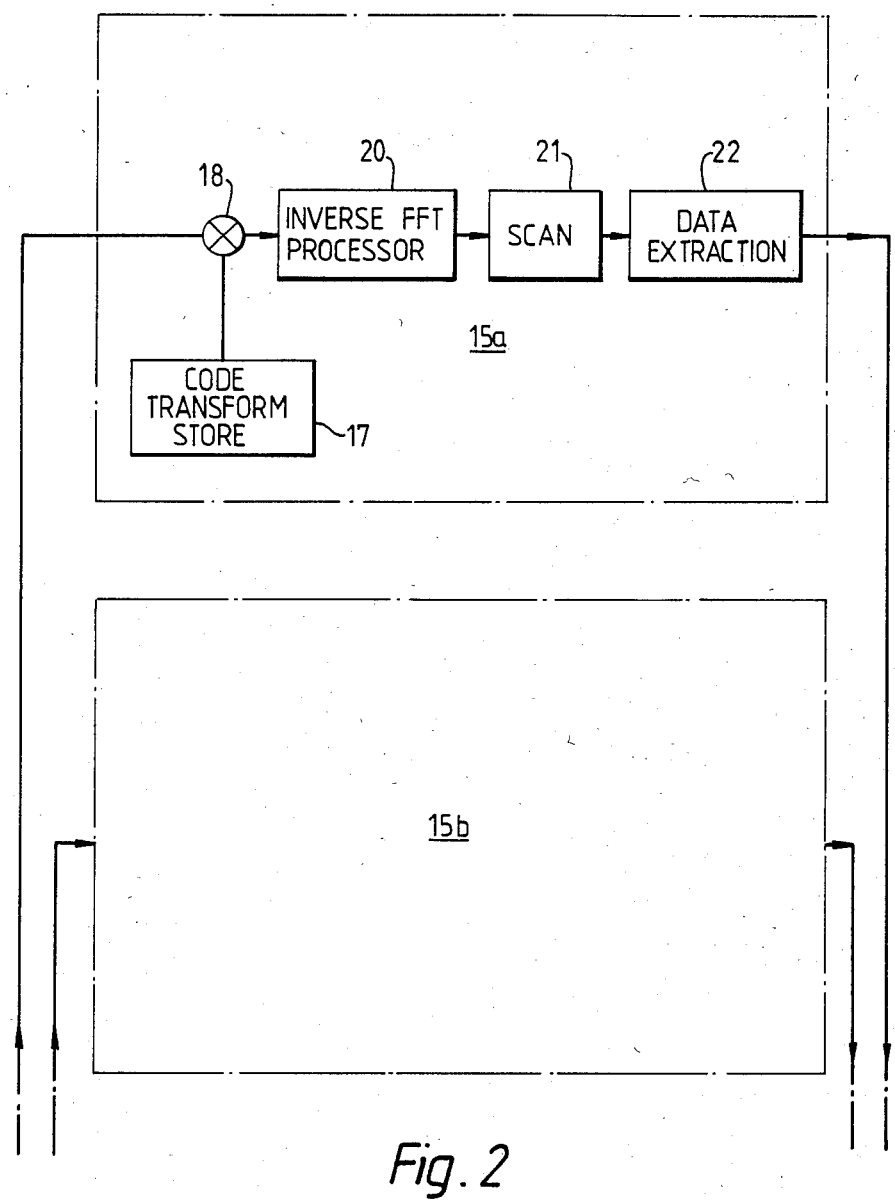
FIG. 2 is a schematic diagram of a sub-circuit of the circuit shown in FIG. 1.

One of the processors 15 $a$ is shown in FIG. 2 and includes a code transform store 17, which contains the transformed C/A code for a particular satellite with an adjustment for Doppler shift. The other processors 15 $b$ to $d$ hold corresponding transformed C/A codes for the other three satellites. In processor 15 $a$, each point in the transform of the signal input to the processor is multiplied in a multiplier 18, by the corresponding point in the transform of the code. The product signals from the multiplier 18 are then inverse transformed in an inverse FFT processor 20. The reordering of data which is usually performed in an FFT is not required in the FFT processors 13 and 20, since processor 20 restores the natural order lost in processor 13. The output signal from the inverse FFT processor 20 is then scanned to find a correlation peak in an amplitude scanner 21 which determines the correlation point of greatest amplitude and outputs the position of the peak, which gives range information. The speed of operation of the FFT processors and multipliers must be such that a batch of 1024 samples can be processed in 10 ms or less. Batches of samples are taken at 10 ms intervals rather than 20 ms since if one batch coincides with a data edge which suppresses correlation, the next batch will not do so. A data extraction processor 22 accepts from the scanner 21, complex values of the correlation peak at 20 ms intervals and fits them to a phase curve and extracts the data. The peaks have a residual Doppler shift of up to ±500 Hz but are sampled at 20 ms intervals which corresponds to 50 Hz. It is highly likely that the data extraction processor 22 will fit the correlation phases to a curve corresponding to an alias of the Doppler residual, but this is unimportant since all such aliased frequencies also carry the data.

The outputs from all four processors 15 $a$ to $d$ are fed to a standard NAVSTAR computer 16 which calculates position from the range information from the correlators and data from the data extractors in a known manner.

The embodiment described above has been given by way of example only and other embodiments incorporating variations or modifications to the described receiver will be apparent to those skilled in the art. For example, in the described embodiment the code transform store 17 in each of the processors 15 $a$ to $d$ contain the transformed C/A code for its satellite. Rather than store the transformed C/A code, it may be convenient to generate the code and transform and store it using the FFT processor 13 before acquisition is attempted.

Further, in the described embodiment, 1 ms of signal is convolved at a time and has a bandwidth of about 1 kHz. For further noise reduction the sample sequence may be increased to give a corresponding reduction in bandwidth. Thus, for example, 16,384 samples span 16 ms of signal, and occupy most of a data bit with 4 ms left for errors in synchronization with the data. Transforming the code is not so difficult since it is repetitive at 1 ms intervals, unlike noise, and so has sidebands at 1 kHz intervals. If appropriate samples of the code are chosen, only one in every sixteen of the 16,384 transform points will be non-zero, and these points can be calculated using a 1024-point transform. Similarly, only 1024 multiplications are needed, but the inverse transform must start from the 16,384 values which include all the zeros.

The bandwidth of the 16,384 sample convolution is 1/16 kHz, about the narrowest in which single data bits may still be recovered. If the Doppler uncertainty, hitherto ignored, is larger than this it is possible to search several Doppler cells by shifting the transform of the signal a suitable number of points in either direction before multiplying by the transform of the code. This is because the signal transform is in fact the frequency spectrum, so a shift of 1 point corresponds to a baseband frequency shift of 1/16 kHz. In this way the signal can always be moved to within 1/32 kHz of the true baseband, and the correlation found. Parallel inverse transform processors could be used to search several Doppler cells at once, starting with the same signal samples.

With respect to the C/A code, an alternative to a longer transform is possible if the Doppler shift is sufficiently well-known. The signal samples are accumulated cyclically in 1023 memory locations, so that the signal is enhanced and the noise tends to cancel. This process can be continued for $\frac{1}{4}$ of a Doppler error cycle before the enhancement is lost. If this is longer than 20 ms, phase corrections for the data must be applied.

Regarding data recovery once correlation has been identified, the complex data point at the correlation point is an estimate of the phase difference between the signal and local oscillator during the sampled period. If this period is the 20 ms of a data bit, the best estimate of the data phase will be obtained. A worse S/N ratio is tolerable for data recovery than for initial correlation, since false correlations are not a problem and a fairly high bit error rate can be corrected by the parity coding.

If it is required to measure the carrier frequency accurately, it will be necessary to include the processor inside a phase locked loop. For this purpose, use can be made of the fact that the I and Q values of the correlation peak are equal to the I and Q outputs of the arm filters of a Costas carrier loop in a conventional receiver, where these filters are of the integrate-and-dump type with an integrated time equal to the correlator's sample sequence length. This is the optimal detector for biphase modulation. The loop can therefore be closed by multiplying the I and Q values together to generate the local oscillator control signal. This, of course, requires a separate local oscillator and signal digitizer for each satellite.

To avoid the problem of the samples coinciding with the code bit edges, it may not be disadvantageous to sample at a different frequency from the code bit rate, e.g. 1024 samples during 1 ms (1023 bits). The comparison code should be similarly sampled.

The number of signal processors corresponding to the processors 15 of FIG. 1 employed in a receiver according to the invention will depend on the maximum number of satellites from which signals can be simultaneously received.

Although a multiple element receiver has been described it will be appreciated that by using time sharing techniques the number of channels can be reduced.

I claim:

1. A navigation satellite system receiver comprising:
    an antenna for receiving an incoming coded, time-based, spread-spectrum, continuous signal which includes navigational data from a plurality, P, of satellites; and
    convolver means, connected to receive signals from said antenna for (a) convolving segments of said signal with codes therein by Fourier transforming said segments, (b) cyclically shifting points of the Fourier transform to produce a transform of a near baseband signal, (c) multiplying said shifted points with corresponding points of a pre-computed transform of a segment of spread spectrum code to give a resultant signal, and (d) inverse transforming said resultant signal to produce a correlation peak at a point having a position which gives the relative shift between said incoming signal and said code.

2. A receiver for a navigation satellite system, comprising:
    an antenna adapted to receive coded, time-based, spreadspectrum, continuous signals which include navigational data from a plurality, P, of satellites;
    means connected to said antenna for deriving baseband I and Q components from said signals;
    means for digitizing said I and Q components;
    a Fast Fourier Transform processor connected to receive said digitized I and Q components and to transform said components and their respective codes and to provide a first transformed signal;
    multiplier means connected to said processor, for receiving said first transformed signal and multiplying together said transformed components and their codes to provide a multiplied signal;
    an inverse Fast Fourier Transform processor connected to said multiplier means, for inverse transforming said multiplied signal and providing a second transformed signal; and
    amplitude scanning means connected to said inverse Fast Fourier Transform processor, for determining correlation peaks in said second transformed signal.

3. A receiver for a navigation satellite system, having an antenna adapted to receive coded, time-based, spreadspectrum, continuous signals which include navigational data from a plurality, P, of satellites, comprising:
    means connected to said antenna for deriving baseband I and Q components from said signals;
    means for digitizing said I and Q components;
    a Faster Fourier Transform processor connected to receive said digitized I and Q components and to transform said components and their respective codes and to provide a first transformed signal;
    multiplier means connected to said processor, for receiving said first transformed signal and multiplying together said transformed components and their codes to provide a multiplied signal;
    an inverse Fast Fourier Transform processor connected to said multiplier means, for inverse transforming said multiplied signal and providing a second transformed signal; and
    amplitude scanning means connected to said inverse Fast Fourier Transform processor, for determining correlation peaks in said second transformed signal.

* * * * *